United States Patent
Tseng

[11] Patent Number: 5,201,334
[45] Date of Patent: Apr. 13, 1993

[54] CRUTCH

[76] Inventor: Jui F. Tseng, No. 29, Ta Yu St., Taichung, Taiwan

[21] Appl. No.: 922,565

[22] Filed: Jul. 30, 1992

[51] Int. Cl.$^5$ .............................................. A61H 3/02
[52] U.S. Cl. ....................................... 135/68; 135/72; 135/76; 403/191
[58] Field of Search .................. 135/65, 68, 69, 72, 135/76; 403/191, 233, 236, 258; 280/606, 821

[56] References Cited

U.S. PATENT DOCUMENTS

| | | | |
|---|---|---|---|
| 2,516,852 | 8/1950 | Burry et al. | 135/72 X |
| 2,798,247 | 7/1957 | Sladky et al. | 403/258 X |
| 2,817,348 | 12/1957 | Holliday, Jr. | 135/72 X |
| 2,960,095 | 11/1960 | Smith, Jr. | 135/68 |
| 3,768,495 | 10/1973 | Smith | 135/72 |
| 4,733,682 | 3/1988 | Ellena | 135/69 |

FOREIGN PATENT DOCUMENTS

| | | | |
|---|---|---|---|
| 367330 | 8/1930 | United Kingdom | 403/258 |
| 993633 | 6/1965 | United Kingdom | 403/258 |

Primary Examiner—Richard E. Chilcot, Jr.
Assistant Examiner—Lan M. Mai
Attorney, Agent, or Firm—Head & Johnson

[57] ABSTRACT

A crutch including a tubular body, an arm support formed in an upper portion of the tubular body, and a hand grip fixed to a middle portion of the tubular body by a sleeve member which is mounted on the middle portion of the crutch and has a pair of flanges superposed with each other whereby each flange has a screw hole formed therein.

3 Claims, 4 Drawing Sheets

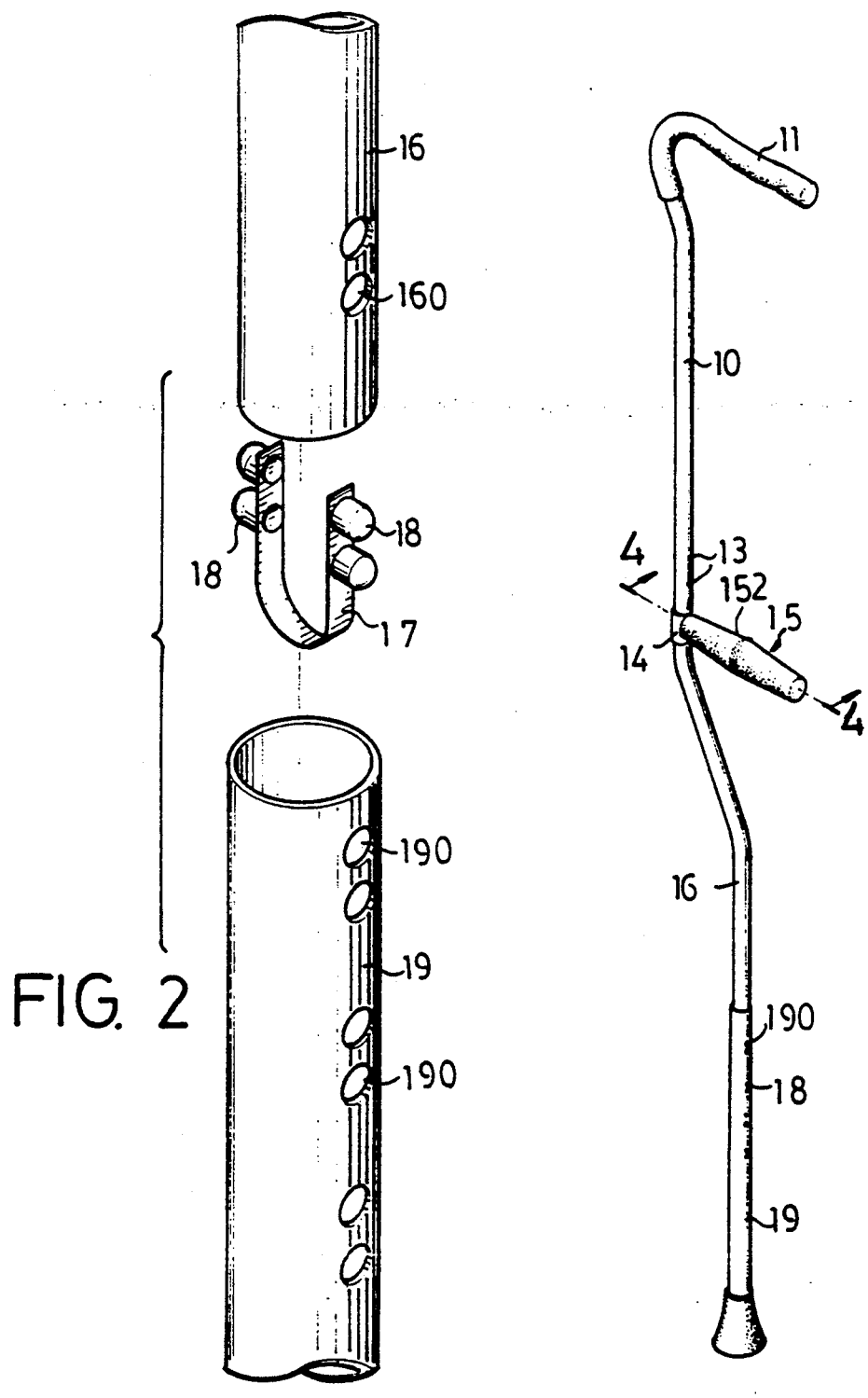

CRUTCH

BACKGROUND OF THE INVENTION

1. Field of the Invention

The present invention relates to a crutch.

2. Description of the Prior Art

A typical crutch is disclosed in U.S. Pat. No. 4,733,682 to Ellena, filed Dec. 16, 1986, entitled "TUBULAR CRUTCH CONSTRUCTION", generally the crutch comprises a pair of bow tubes 10 bridged at their upper extremities 12 by an arm support 14 and at their midsections 16 by a hand grip 18, and a tubular carrier 32 disposed between the lower bow portions 28, and a foot member 48 adjustably engaged in the carrier tube 32. The configuration of the crutch is complicated and the manufacturing costs thereof is high.

The present invention has arisen to mitigate and/or obviate the afore-described disadvantages of the conventional crutches.

SUMMARY OF THE INVENTION

The primary objective of the present invention is to provide a crutch which has a simplified structure and the manufacturing fees thereof is low.

In accordance with one aspect of the invention, there is provided a crutch comprising a tubular body including an arm support formed in an upper portion thereof, and a hand grip fixed to a middle portion of the tubular body, whereby the crutch has a simplified configuration.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 1 is a perspective view of a crutch in accordance with the present invention;

FIG. 2 is a partial exploded view of the lower portion of the crutch;

DETAILED DESCRIPTION OF THE PREFERRED EMBODIMENT

Figure 3:
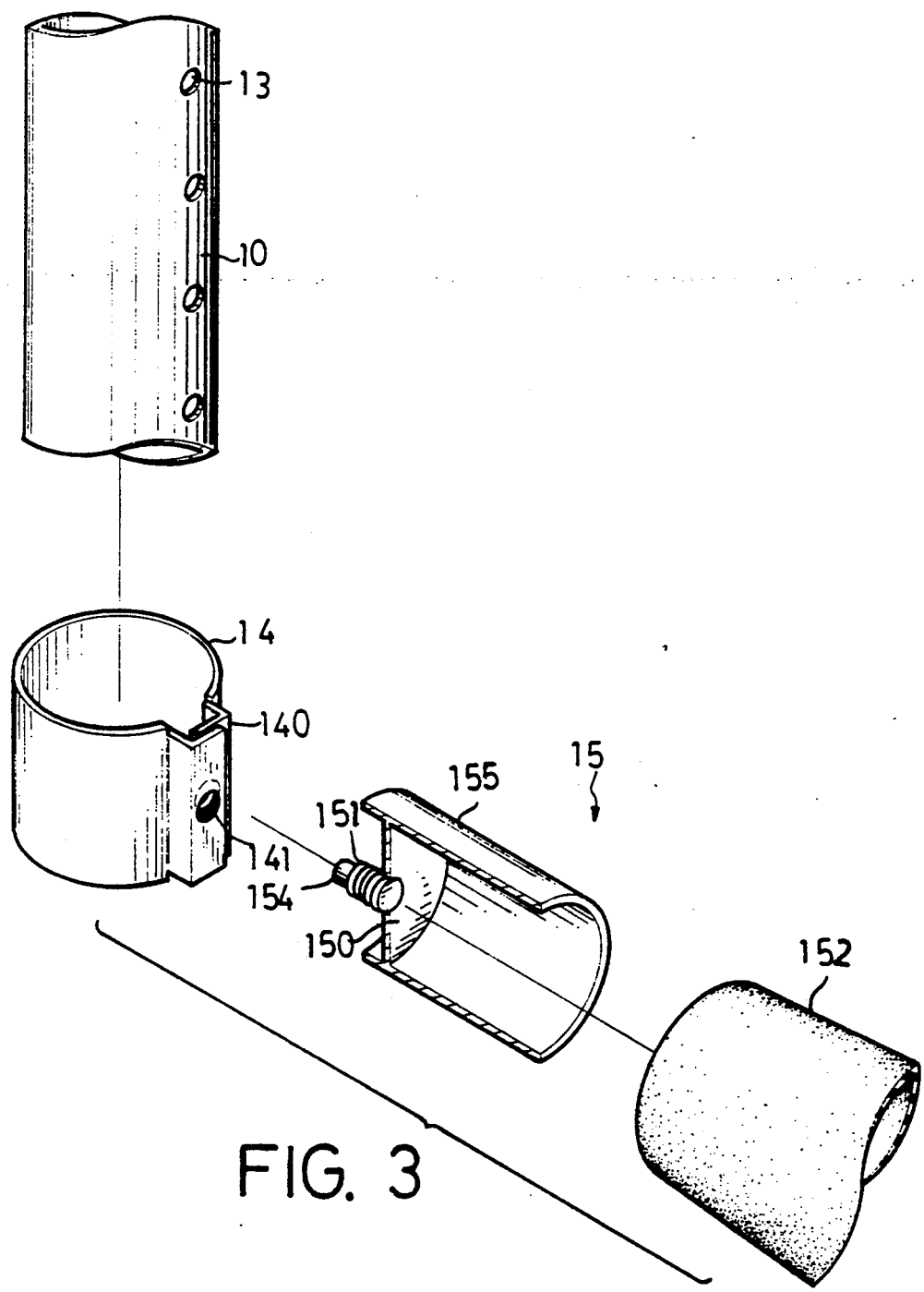
FIG. 3 is a partial exploded view of the hand grip.

Referring to the drawings, and initially to FIG. 1, a crutch in accordance with the present invention comprises a tubular body 10 including an arm support 11 formed in the upper portion and bent from the upper portion of the tubular body 10, a hand grip 15 fixed to the middle portion of the tubular body 10, and a foot member 19 coupled to the lower portion 16 of the tubular body 10; the crutch has a simplified structure and can be easily formed from a tubular member, such that the manufacturing cost is greatly decreased.

Referring next to FIG. 2, the lower portion 16 of the tubular body 10 is slidably engaged in the upper portion of the foot member 19 and includes two pairs of holes 160 oppositely formed therein, and a plurality pairs of holes 190 are formed in the upper portion of the foot member 19, the detents 18 projected from the spring element 17 are biased radially outwards to engage through the holes 160, 190 of the tubular body 10 and of the foot member 19 respectively, such that the foot member 19 can be adjusted relative to the lower portion 16 of the tubular body 10.

Figure 4:
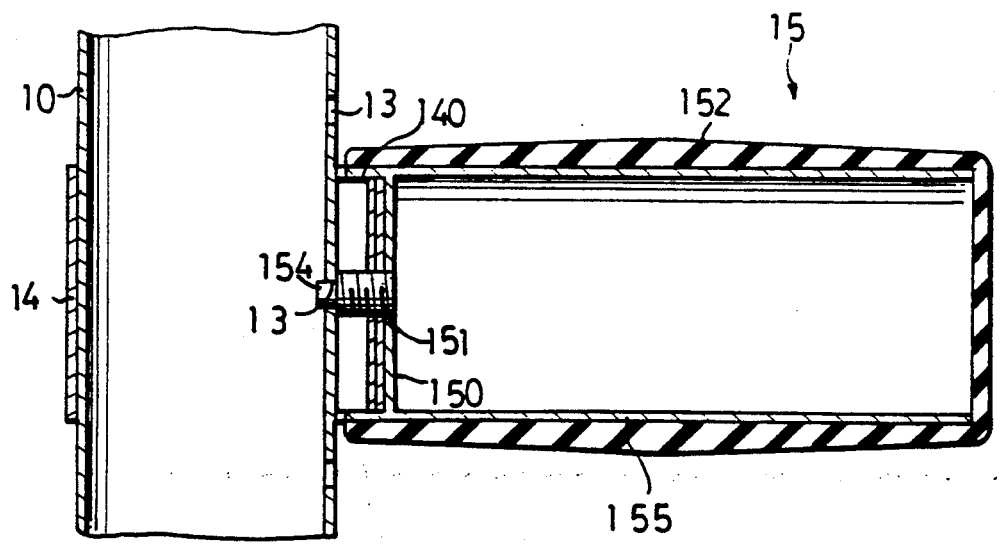
FIG. 4 is a partial cross sectional view taken along lines 4—4 of FIG. 1.

Referring next to FIGS. 3 and 4, the tubular body 10 includes a plurality of orifices 13 formed in the middle portion thereof, a sleeve 14 is engaged on the tubular body 10 and includes a pair of flanges 140 superposed with each other and each having a screw hole 141 formed therein, the hand grip 15 includes a pipe 155 having a disc 150 formed integral in one end thereof, a bolt 151 formed integral with the disc 150 for engagement with the screw holes 141 of the flanges 140 of the sleeve 14, a sheath 152 engaged on the pipe 155 so that the user may feel comfortable when gripping the hand grip 15, and a stub 154 is formed integral with the bolt 151 for engagement in either of the orifices 13 so that the hand grip 15 can be retained in place.

Figure 6:
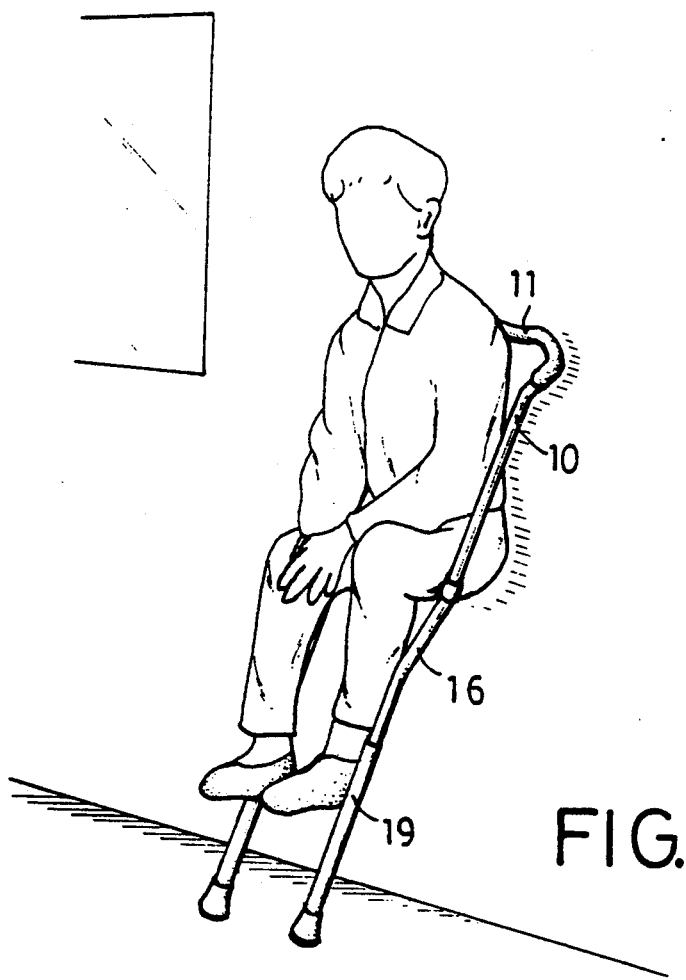
FIG. 5 and 6 are perspective views illustrating the usage of the crutch.
Figure 5:
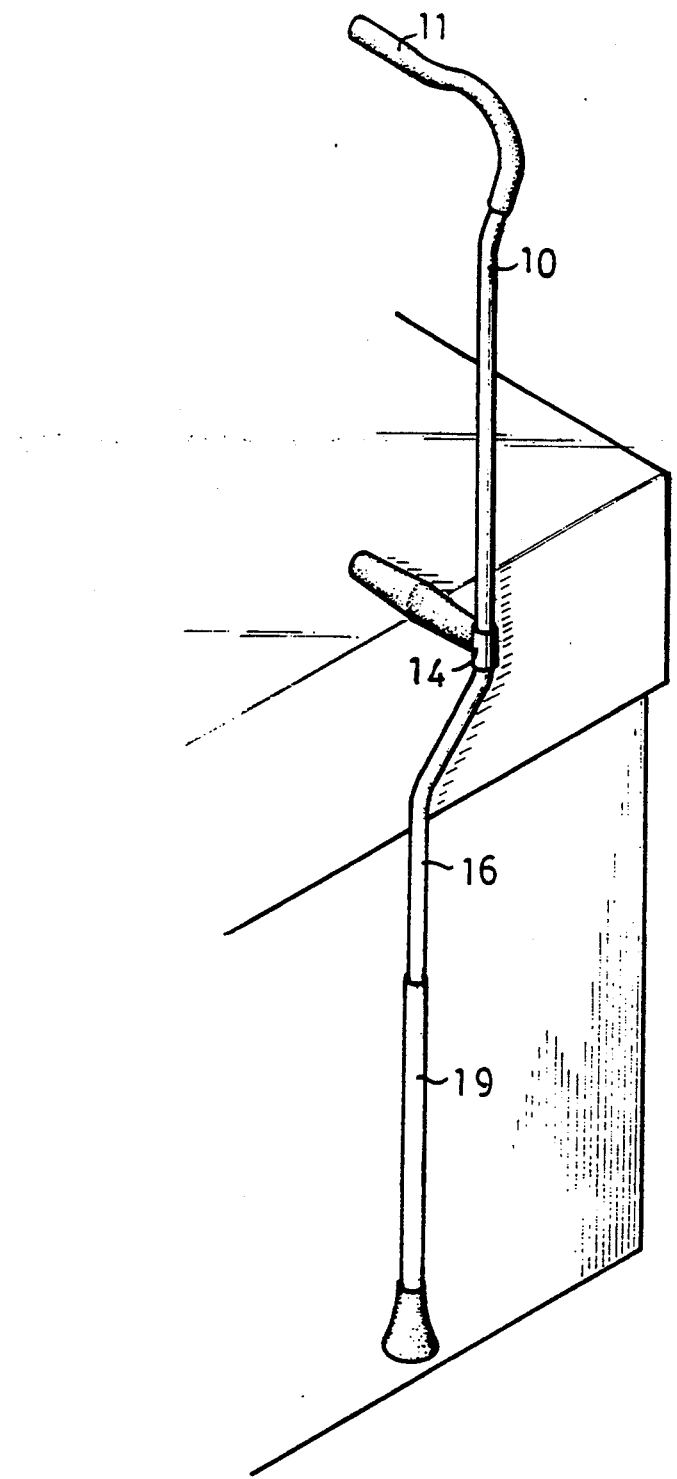

Referring next to FIG. 5, the crutch can be supported in place either by the arm support 11 or by the hand grip 15; it is to be noted that the arm support and the hand grip of the conventional crutch are fixed between bow tubes such that the conventional crutch can not be supported in the way as shown in FIG. 5. Referring next to FIG. 6, the hand grips 15 of a pair of crutches form a seat for supporting a user when the hand grips 15 are directed toward each other.

It is to be noted that the tubular carrier of the conventional crutch is fixed between the bow portions by bolts extending through the tubular carrier and the bow portions, such that the movement of the foot member relative to the carrier tube is limited and prohibited. However, the lower portion 16 of the tubular body 10 is open and has no bolts laterally extended therethrough such that the movement of the foot member relative to the tubular body is not limited.

Accordingly, the crutch in accordance with the present invention includes a simplified configuration and the manufacturing cost is greatly decreased.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A crutch comprising
   a tubular body includes an upper portion and a middle portion, an arm support formed in said upper portion, at least one orifice formed in said middle portion;
   a hand grip fixed to said middle portion; said hand grip includes a pipe having a bolt fixed to one end;
   a sleeve engaged on said middle portion of said tubular body; said sleeve including a pair of flanges superposed with each other and wherein each of said flanges having a screw hole formed therein;
   wherein said bolt is threaded through said screw holes of said flanges and engaged in said orifice to secure said hand grip in place.

2. A crutch comprising a tubular body including an arm support formed in an upper portion thereof, and a hand grip fixed to a middle portion of said tubular body, said tubular body including at least one orifice formed in said middle portion thereof, said hand grip including a pipe having a bolt fixed to one end thereof, a sleeve engaged on said middle portion of said tubular body and including a pair of flanges superposed with each other and each having a screw hole formed therein, said bolt of said pipe being threaded through said screw holes of said sleeve and engaged in said orifice of said tubular body so as to fix said hand grip in place.

3. A crutch comprising a tubular body including an arm support formed in an upper portion thereof and including a lower portion, and a hand grip fixed to a middle portion of said tubular body, said tubular body including at least one orifice formed in said middle portion thereof, said hand grip including a pipe having a bolt fixed to one end thereof, a sleeve engaged on said middle portion of said tubular body and including a pair of flanges superposed with each other and each having a screw hole formed therein, said bolt of said pipe being threaded through said screw holes of said sleeve and engaged in said orifice of said tubular body so as to fix said hand grip in place, and a foot member slidably engaged on said lower portion of said tubular body and an engaging means for coupling said foot member and said lower portion of said tubular body together.

* * * * *